United States Patent [19]
Morris, II

[11] 3,880,377
[45] Apr. 29, 1975

[54] WINDING DEVICE FOR KITES

[76] Inventor: Clark W. Morris, II, 3025 Becerra Way, Sacramento, Calif. 95821

[22] Filed: Feb. 19, 1974

[21] Appl. No.: 443,616

[52] U.S. Cl. ............... 242/86.5 R; 244/155 A
[51] Int. Cl. ............................. B65h 17/46
[58] Field of Search...... 242/54 R, 86.5; 244/155 A, 244/155 R

[56] References Cited
UNITED STATES PATENTS

| 488,563 | 12/1892 | Hovendick | 242/86.5 R |
| 536,411 | 3/1895 | Wolff | 242/86.5 R |
| 2,600,049 | 6/1952 | Crider | 244/155 A |

*Primary Examiner*—Edward J. McCarthy
*Attorney, Agent, or Firm*—Blair & Brown

[57] ABSTRACT

A device is provided for winding in kites and the like, and wherein the device is adapted to be mounted on a bicycle so that by inverting the bicycle the kite, ballon or other member can be wound in by causing rotation of a wheel of the bicycle.

4 Claims, 14 Drawing Figures

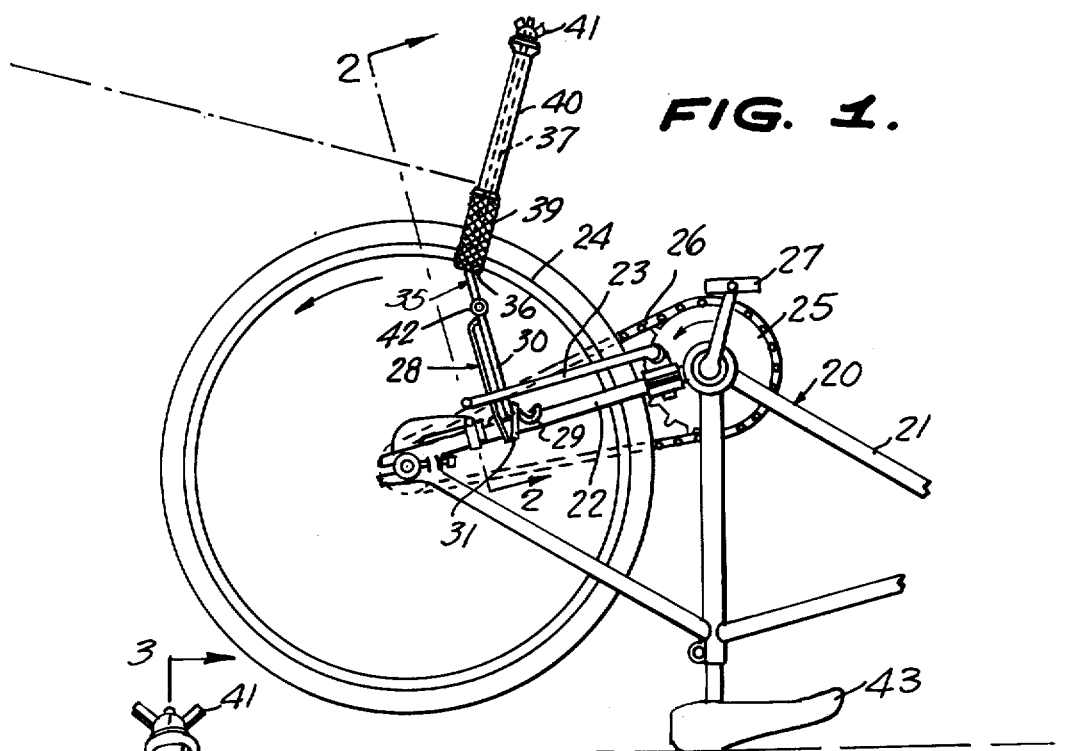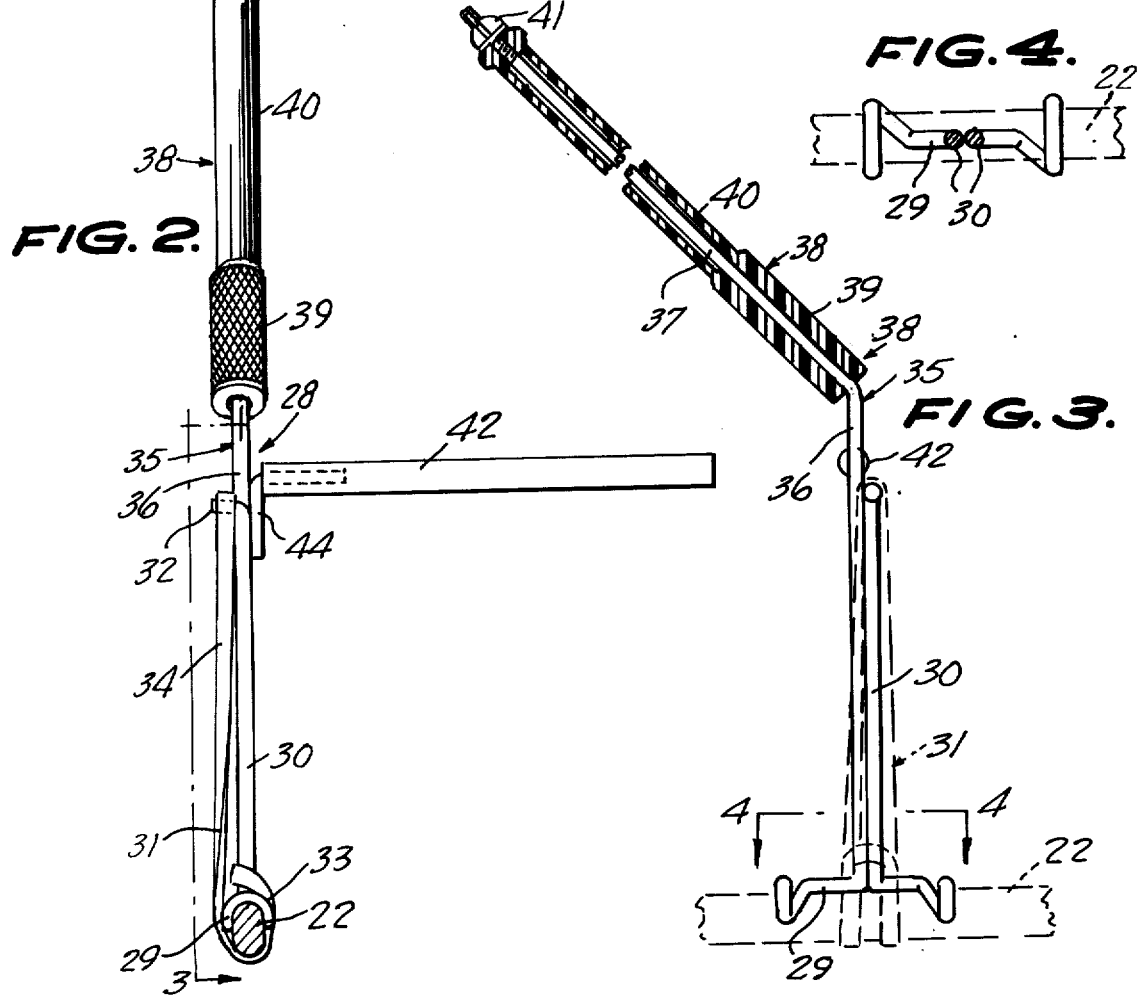

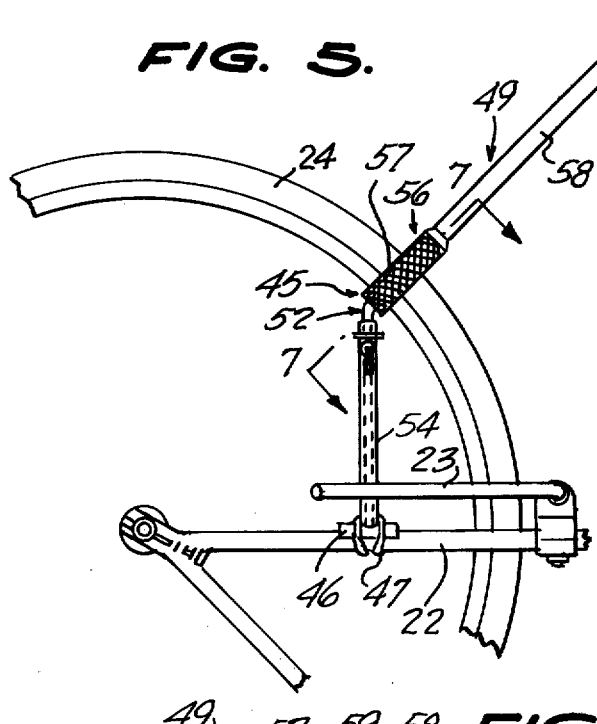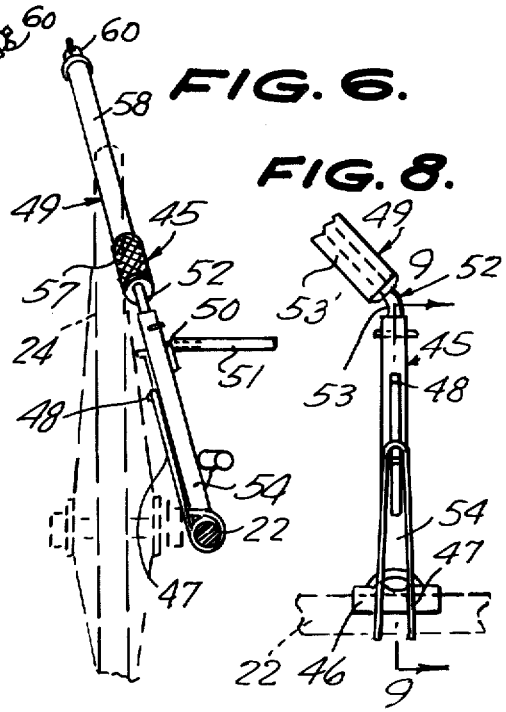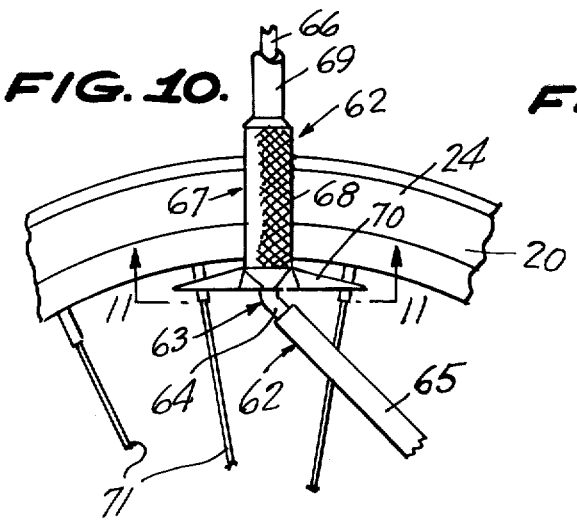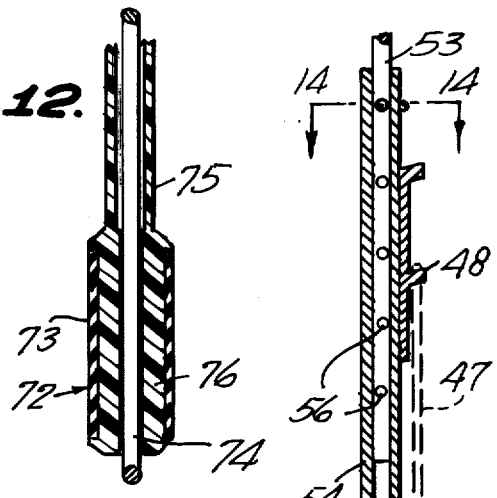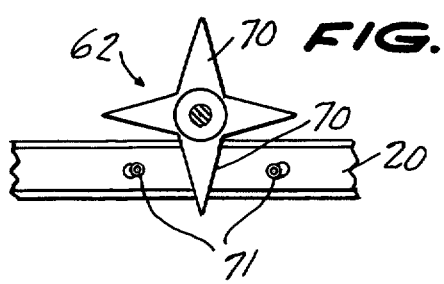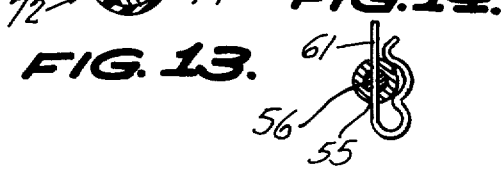

3,880,377

WINDING DEVICE FOR KITES

BACKGROUND OF THE INVENTION

1. Field of the Invention

The present invention relates to devices for winding in kites and the like, and more particularly to a winding device that is adapted to be operated by a conventional bicycle.

2. Summary of the Invention

A device is provided for winding in kites, ballons or other members, and wherein the device is adapted to be connected to a conventional bicycle. The bicycle is adapted to be inverted or arranged upside down whereby the user can manually move the pedal mechanism of the bicycle to cause the rear wheel of the bicycle to turn and this in turn will rotate a member to wind the string of the kite thereon so that the kite can be returned to a ground position.

The primary object of the invention is to provide a device for winding in kites and the like wherein the device consists of a unit that can be readily attached to or removed from a conventional bicycle so that kites or other members can be conveniently wound in when desired or required.

Still another object of the present invention is to provide a kite winding in device that will improve or enhance the sport of kite flying since it provides a simple, fast, economical and fun means for winding in and flying a kite.

Still another object of the present invention is to provide a kite winding in device that is ruggedly constructed and fool proof in use and which is simple and inexpensive to manufacture.

Other objects and advantages will become apparent in the following specification when considered in light of the attached drawings.

BRIEF DESCRIPTION OF THE DRAWINGS

FIG. 1 is a fragmentary elevational view illustrating the winding device of the present invention mounted on a bicycle;

FIG. 2 is an enlarged sectional view taken on the line 2—2 of FIG. 1;

FIG. 3 is a sectional view taken on the line 3—3 of FIG. 2;

FIG. 4 is a sectional view taken on the line 4—4 of FIG. 3;

FIG. 5 is an elevational view illustrating a modified form of the present invention;

FIG. 6 is a view taken at right angles to the view shown in FIG. 5;

FIG. 7 is an enlarged sectional view taken on the line 7—7 of FIG. 5;

FIG. 8 is a view illustrating certain constructional details of the device of FIGS. 5 and 6;

FIG. 9 is a sectional view on an enlarged scale taken on the line 9—9 of FIG. 8;

FIG. 10 is a fragmentary elevational view illustrating a modified or further alternative form of the present invention;

FIG. 11 is a sectional view taken on the line 11—11 of FIG. 10;

FIG. 12 is a fragmentary sectional view illustrating certain constructional details of the present invention;

FIG. 13 is a transverse sectional view taken through the device of FIG. 12; and

FIG. 14 is a sectional view taken on the line 14—14 of FIG. 9.

DESCRIPTION OF THE PREFERRED EMBODIMENT

Referring now to the drawings in detail, wherein like reference characters indicate like parts throughout the several figures, the reference numeral 20 indicates a portion of a bicycle that includes the usual frame 21 that has the frame piece 22, FIG. 1, and the numeral 23 indicates the usual kick stand. The numeral 24 indicates the rear wheel or tire of the bicycle, and the numeral 43 indicates the usual seat of the bicycle. There is further provided the sprocket 25 that has the endless chain 26 thereon, and the numeral 27 indicates the pedal mechanism.

In accordance with the present invention there is provided a device or unit 28 that is adapted to be connected to the bicycle 20 when the bicycle 20 is in an inverted position as shown in FIG. 1 whereby a kite can be conveniently wound in. The unit 28 includes a support portion 30 that has a saddle or yoke 29 thereon for engaging the frame piece 22, and the numeral 31 indicates a resilient band or rubber band that extends between lug portions 32 and 33 for maintaining the unit connected to the bicycle frame.

As shown in FIG. 3 for example there is provided a rod 35 that includes a first portion 36 as well as a second portion or section 37, and the portion 37 is arranged at an angle with respect to the portion 36. The numeral 38 indicates a sleeve that is made of a suitable material such as rubber or plastic, and the sleeve 38 includes a knurled portion 39 as well as a reduced diameter portion or section 40, and the portion 40 is adapted to have the kite string wound thereon. The numeral 41 indicates a securing element such as a wingnut assembly that is provided for maintaining the parts in their assembled position.

As shown in FIG. 2 a hook member 44 is suitably secured to the unit, and a tubing 42 is mounted on the hook portion 44.

Attention is now directed to FIGS. 5, 6, 7, 8 and 9 of the drawings wherein the numeral 45 indicates a modified or alternative winding device that is indicated generally by the numeral 45, and wherein the device 45 includes a saddle or yoke 46 that engages the bicycle frame piece 22, and a rubber band 47 serves to maintain the saddle 46 in place against the frame piece 22. The numeral 48 indicates a lug member on a support piece 54 that is adapted to be engaged by the rubber band 47. The numeral 50 indicates a hook member that is secured to the support portion 54, and a tubular member 51 is mounted on the hook portion 50. The numeral 52 indicates a rod that has a first portion 53 that is mounted in the support portion 54, and the rod 52 further includes a second portion 53' that is arranged at an angle with respect to the portion 53. The numeral 55 indicates an opening through the support portion 54. Spaced openings 56 in the section 53 are adapted for selective alignment with the opening 55 and a pin 61, shown in FIG. 14, is adapted to extend through aligned openings 55, 56 in order to maintain the parts stationary in their adjusted position. The numeral 49 indicates a sleeve that is mounted on the rod section 53, and the sleeve 49 includes a knurled portion 57 as well as a reduced diameter section or portion 58 that is adapted to have the kite string wound thereon. As shown in FIG. 7 a bushing 59 may be arranged within the sleeve 49 in the vicinity of the knurled portion 57.

Referring now to FIGS. 10 and 11 of the drawings, the numeral 62 indicates a further modified kite winding device, and wherein the device 62 includes a rod 63 that includes a first portion 64 having a member 65 thereon, and the rod 63 further includes a second portion 66 that is arranged at an angle with respect to the portion 64. The numeral 67 indicates a sleeve that is mounted on the portion 66, and the sleeve 67 includes a knurled portion 68 as well as a reduced diameter portion 69 and the portion 69 is adapted to have a kite string wound thereon. As shown in the drawings the sleeve 67 may have a toothed gear unit 70 thereon for engagement by the spokes 71 of the bicycle wheel 24.

Referring to FIGS. 12 and 13 of the drawings there is illustrated a portion of a modified sleeve that is indicated generally by the numeral 72, and wherein the sleeve 72 may include an outer covering 73 that is arranged on an enlarged portion 76 of the sleeve, and the sleeve has a rod 74 extending therethrough. The sleeve 72 further includes a reduced diameter portion 75 that is adapted to have the kite string wound thereon.

From the foregoing, it will be seen that there has been provided a device for winding in kites and the like, and when in use with the parts arranged as shown in the drawings and in particular as shown in FIGS. 1 through 4 of the drawings, a bicycle such as the bicycle 20 is adapted to be inverted so that it rests on its seat 43. Then, the device 28 of the present invention can be connected to the bicycle as shown in the drawings so that the saddle 29 engages the frame piece 22, and the kick stand 23 can exsert pressure against the support portion 30. One or more rubber bands 34 can be used for maintaining the device connected to the frame of the bicycle. The knurled portion 39 of the sleeve 38 is arranged in engagement with the bicycle tire or wheel 24. Then, with the kite string engaging the portion 40 of the sleeve 38, the child or other user can manually rotate the pedal 27 so as to turn the sprocket 25 and this cause movement of the chain 26 which in turn will rotate the rear wheel 24 so as to rotate the sleeve 38 in order to wind the kite in, in the desired manner.

When using the device of FIGS. 5 through 9, the knurled portion 57 of the device 45 engages the bicycle wheel 24 so as the bicycle 24 is rotated, the sleeve 49 will be rotated in order to wind the kite string around the portion 58.

In the arrangement shown in FIGS. 10 and 11, the device includes a gear member 70 whose teeth are adapted to be engaged by the spokes 71 of the wheel 24 whereby rotation of the wheel will cause rotation of the sleeve 67 so that a kite string can be wound on the portion 69.

In FIGS. 12 and 13 there is illustrated an arrangement wherein the sleeve may have a knurled or outer covering 73 for engaging the outer periphery of the bicycle wheel.

The parts can be made of any suitable material and in different shapes and sizes as desired or required.

In FIGS. 1 through 4 the numeral 39 indicates the knurled portion of the rubber sleeve 38 that is used for tracking. This knurled portion 39 is normally long enough to fit against any bike tire, i.e. assuming that the device is normally manufactured and sold for a twenty inch bike, the knurled portion would not work on other sizes. Therefore, as the tire should run on or touch the portion at a 45° angle, if a person has a larger bike they would just bend the rod 35 to adjust to their required size.

The saddle can be placed on the bike so that it can be pushed up against the brake bar bracket so that the tire will track correctly. If a larger bicycle is being used, the saddle can be placed on the frame further away from the brake bar bracket with enough clearance so that the operator, as he turns the pedals 27, does not hit the removeable push rod.

The numeral 42 indicates a removeable tubing made of a material such as plastic or the like which is placed by the user on the projecting hook portion 44. When using the device, force is applied against the opposite end of the tubing 42 by placing it against the upper leg or thigh. As the child pushes slightly against the end, portion 39 is forced against the tire in more positive traction than one would get if depending on the bikes stand to hold the driver 39 against the tire. This leaves one hand of the user free to guide the kite string evenly on portion 40 as it is being wound in.

The rubber band 34 is used for holding the device onto the bike frame.

It will be seen that in accordance with the present invention the person flying the kite utilizes his or her bicycle for motive power in winding up the kite string. The device is relatively small and yet will bring a kite down far more quickly and with less energy on the part of the person flying the same. Once the winder is in position and secured, one merely grasps and turns the bicycle pedal which of course turns the bicycle wheel.

In FIGS. 10 and 11 a sprocket gear device 70 is used which is another variation and which will serve the same purpose of winding in the kite string. This is accomplished by using the bicycle wheel spokes 71 especially if for some reason the rubber band did not hold the winder tight enough to the tire.

FIGS. 9 and 14 illustrate the device that can be adjusted by means of holes and the cotter key 61 to various sizes of bicycle wheels.

The number of teeth on the member 70 can be varied as desired. The arrangement shown in FIGS. 10 and 11 will give more pull, and it may be used in conjunction with a rubber band track for even more positive traction.

The kite winding in device of the present invention is a fast simple, fun like way to wind in any kite, by simply turning any bicycle such as a 20 inch to 27 inch bicycle upside down, and attaching the device as shown. Once the kite has been wound in, the sleeve 38 can be removed by unscrewing the wingnut 41 or the wingnut 60.

The device is simple in operation and structure. The operation is extremely fast and can wind in string as fast as two thousand RPM or faster with little physical effort. An important feature is that the device can be manufactured and sold cheaply. Also the device has a novel operation and is fun to use because it is enjoyable to wind in a kite in this manner and especially at such speeds. Another feature is that the sleeve that the string winds on is detachable so that when one wants to fly their kite again it can be done in the traditional manner from the sleeve only, as opposed to cumbersome reels, winches or flat boards. A further feature is that one is not limited to the amount of string that could be wound on the sleeve as in a reel.

Having thus described the preferred embodiment of the invention it should be understood that numerous structural modifications and adaptations may be resorted to without departing from the spirit of the invention.

What is claimed is:

1. In combination with a bicycle of the type having a frame and a wheel and manually operable means for rotating the wheel a device for winding in kites and the like comprising a support member having a saddle for engaging a portion of the bicycle frame, a lug affixed to said support member, a resilient band engaging said lug and saddle detachably securing said support member to said bicycle frame, a rod extending from said support member and including sections arranged angularly with respect to each other, a sleeve mounted for rotation on said rod and having a knurled portion for engaging the bicycle wheel, said sleeve including a reduced diameter cylindrical portion for receiving the kite string and a securing element for maintaining the sleeve on said rod.

2. A device as claimed in claim 1 including a star gear secured to said sleeve for driving engagement with the spokes of the bicycle wheel.

3. A device as claimed in claim 1 including a bushing mounted in said sleeve for anti-friction engagement with said rod.

4. A device as claimed in claim 1 including selective means for varying the effective links of said sleeve and rod.

* * * * *